US012450395B2

(12) United States Patent
Nainar et al.

(10) Patent No.: US 12,450,395 B2
(45) Date of Patent: Oct. 21, 2025

(54) TECHNIQUES FOR PROTECTING SENSITIVE DATA WITHIN ELECTRONIC COMMUNICATIONS

(71) Applicant: Cisco Technology, Inc., San Jose, CA (US)

(72) Inventors: Nagendra Kumar Nainar, Morrisville, NC (US); Suresh Kumar Shanmugam, Bangalore (IN); Rajiv Asati, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 181 days.

(21) Appl. No.: 18/301,058

(22) Filed: Apr. 14, 2023

(65) Prior Publication Data
US 2024/0346180 A1 Oct. 17, 2024

(51) Int. Cl.
*G06F 21/62* (2013.01)
*H04L 51/063* (2022.01)

(52) U.S. Cl.
CPC ........ *G06F 21/6263* (2013.01); *H04L 51/063* (2013.01); *G06F 2221/2141* (2013.01)

(58) Field of Classification Search
None
See application file for complete search history.

(56) References Cited

U.S. PATENT DOCUMENTS

| | | | | |
|---|---|---|---|---|
| 9,003,542 | B1* | 4/2015 | MacKay | G06F 21/50 726/26 |
| 9,177,174 | B1* | 11/2015 | Shoemaker | G06F 21/6254 |
| 9,813,412 | B1* | 11/2017 | Yang | H04L 63/145 |
| 9,842,218 | B1* | 12/2017 | Brisebois | H04L 63/101 |
| 2007/0124500 | A1 | 5/2007 | Bedingfield et al. | |
| 2016/0253521 | A1* | 9/2016 | Esmailzadeh | G06F 21/602 726/4 |
| 2017/0302604 | A1* | 10/2017 | Rivelli | H04L 51/10 |
| 2020/0336501 | A1 | 10/2020 | Lewis et al. | |
| 2021/0344724 | A1 | 11/2021 | Noon et al. | |
| 2022/0239666 | A1 | 7/2022 | Greevy | |
| 2023/0237195 | A1* | 7/2023 | Noon | G06F 21/6254 726/4 |

* cited by examiner

*Primary Examiner* — Philip J Chea
*Assistant Examiner* — James Ross Hollister
(74) *Attorney, Agent, or Firm* — Lee & Hayes, P.C.

(57) ABSTRACT

Techniques are described herein for managing access to sensitive data detected within an electronic communication. In some embodiments, such techniques may comprise receiving, from a sender, an electronic communication directed toward a first recipient. The techniques may then comprise identifying one or more pieces of sensitive data within the electronic communication, providing a content of the one or more pieces of sensitive data to a data hosting device to be stored in a memory location and first information associated with the first recipient used to access the memory location, updating the electronic communication to replace the one or more pieces of sensitive data with a reference to the memory location, and transmitting the electronic communication to the first recipient.

17 Claims, 9 Drawing Sheets

TECHNIQUES FOR PROTECTING SENSITIVE DATA WITHIN ELECTRONIC COMMUNICATIONS

TECHNICAL FIELD

The present disclosure relates generally to managing access to sensitive data, and more particularly to replacing sensitive data within an electronic communication to a link that references a secure location in memory in order to manage access to the sensitive data.

BACKGROUND

Electronic mail (e.g., Email) is currently one of the most popular forms of communication available. While popular, this form of communication is prone to sharing of sensitive data (e.g., passwords), whether intentional or unintentional. For example, automated emails generated from an application may have embedded a username/password directly in the communication. In this example, the sensitive data might be vulnerable to any attack in which the communication can be accessed by an unauthorized third party.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
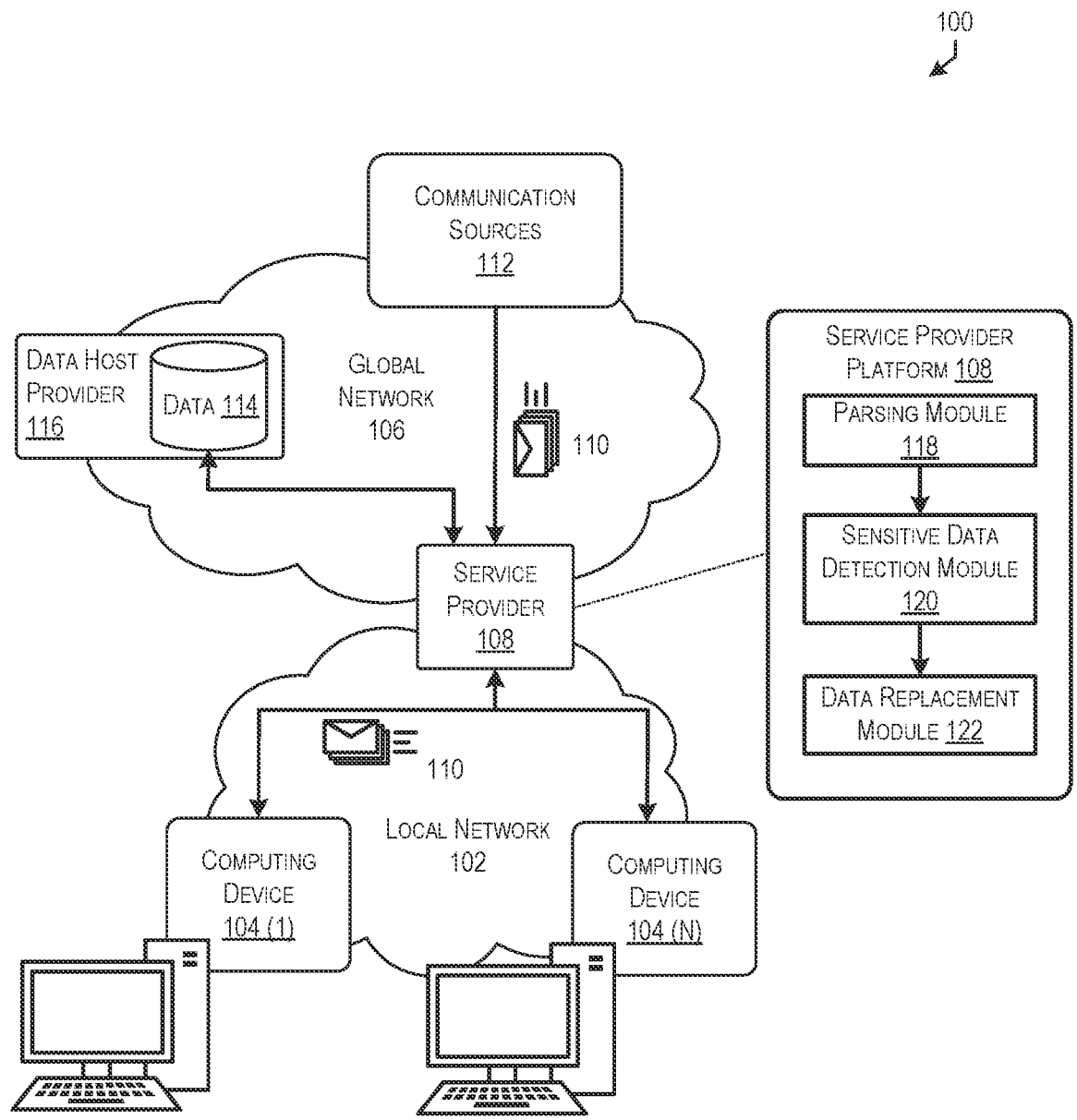
FIG. 1 depicts an example environment that includes a service provider platform that may be used to manage sensitive data within electronic communications in accordance with at least some embodiments.

A first method according to the techniques described herein may include receiving, from a sender, an electronic communication directed toward a first recipient. Upon receiving the electronic communication, the method further includes identifying one or more pieces of sensitive data within the electronic communication, providing a content of the one or more pieces of sensitive data to a data hosting device to be stored in a memory location and first information associated with the first recipient used to access the memory location, and updating the electronic communication to replace the one or more pieces of sensitive data with a reference to the memory location. Once the electronic communication has been updated, the method may further include transmitting the electronic communication to the first recipient.

In some cases, the method may further include receiving, from the first recipient, the electronic communication to be forwarded to a second recipient. Upon receiving the electronic communication, the method further includes determining whether the second recipient should be granted access to the sensitive data, and providing, to the data hosting device, second information associated with the second recipient used to access the memory location. The method may further include transmitting the electronic communication to the second recipient.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques that may be performed to identify and secure sensitive data detected within electronic communications (e.g., email communications). In such techniques, the electronic communication is parsed to identify text and/or images that are likely to be considered sensitive in nature. Upon identifying sensitive data, the contents of that sensitive data may be stored at a memory location hosted on a data hosting device. The sensitive data is then replaced within the electronic communication with a reference to the location in memory (e.g., a link). Once this replacement has been made, the updated electronic communication is routed to the intended recipient.

Upon receiving the electronic communication, the recipient is able to click on (or otherwise interact with) the reference (e.g., link) in order to access the sensitive data. In embodiments, the computing device attempting to access the sensitive data may be configured to provide access credentials to the data hosting device in order to authenticate itself. In one example, the access credentials might be independently generated by the computing device and might include a hash value generated using some combination of information about the sender and/or user.

In some cases, the original recipient of the electronic communication may elect to forward that electronic communication to one or more additional recipients. In these cases, the techniques may further include determining whether the one or more additional recipients should be granted access to the sensitive data. In some cases, this might involve contacting the original sender of the email to receive an indication as to whether such access should be allowed. In other cases, this might involve making such a determination automatically based on a role of the additional recipients and/or a relationship of the one or more recipients to the original recipient. For example, if the email is forwarded to a spouse of the original recipient, then that spouse may be granted access to the sensitive data as well. Upon determining that at least one second recipient should be granted access to the sensitive data, the techniques may include providing information to the data hosting device that can be used to access the sensitive data. For example, in cases in which a hash value is used to authenticate a user to gain access to the sensitive data, the techniques may involve providing a second hash value to the data hosting device that can also be used to gain access to the sensitive data.

Embodiments of the disclosure provide for a number of advantages over conventional systems. For example, embodiments of the system allow for electronic communications to be routed between users while preventing exposure to sensitive data in a non-invasive manner. In this example, the sensitive data is removed from the email communications without requiring user interaction while remaining accessible to the intended recipient.

Additionally, embodiments of the disclosure enable a sender of an electronic communication to manage who can and cannot gain access to sensitive data that s/he has provided. To the extent that the sender had only intended the sensitive data to be provided to the original recipient, that sender, that sender can prevent further dissemination of the sensitive data to other recipients.

FIG. 1 depicts an example environment 100 that includes a service provider platform that may be used to manage sensitive data within electronic communications in accordance with at least some embodiments. As depicted, an organization may maintain a local network 102 that provides connectivity between a number of computing devices 104 (1-N) within the organization. The local network 102 may be in communication with a global network 106 (e.g., the Internet) via an edge device that provides ingress/egress between the local network 102 and the global network 106, such as a router device.

A service provider computing device 108 may be implemented in the example environment. Such a service provider computing device 108 may be any suitable electronic device configured to perform the functions described herein. In embodiments, the service provider 108 may be configured to detect and manage sensitive data included within one or more electronic communications 110 originating from a number of communication sources 112 and directed to the number of computing devices 104.

In embodiments, the service provider computing device 108 is configured to detect sensitive data included within an email communication, store any detected sensitive data in a remote (and secure) memory location at a data store 114 of a data host provider 116, and replace the sensitive data with a reference to the memory location. In order to perform the functions as described herein, the service provider computing device 108 may include a number of components (e.g., engines or modules) configured to perform various portions of the functions. For example, the service provider computing device 108 may include a parsing module 118 configured to parse and analyze textual data included within the email communication 110, a sensitive data detection module 120 configured to determine what, if any, portion of the information included within the email communication 110 is to be considered "sensitive," and a data replacement module 122 configured to store the sensitive data in a secure memory location and to replace that sensitive data within the email communication 110 with a reference to the memory location.

A parsing module 118 may be, when executed in conjunction with one or more processors, configured to parse through a received email communication to identify words and/or phrases within the communication as well as relationships between the various words and/or phrases. In some cases, the parsing module 118 may be configured to identify images within the communication.

A sensitive data detection module 120 may be, when executed in conjunction with one or more processors, configured to identify words and/or phrases within the communication that are likely to be considered "sensitive" data. Sensitive data may include any data that might be used by an unauthorized party to gain access to a user's resources or account. In some embodiments, sensitive data may be identified based on a format and/or content of the sensitive data. In some embodiments, sensitive data may be identified based on a context in which the sensitive data is presented.

In some embodiments, the sensitive data detection module 120 may be implemented as a machine learning model. For example, a machine learning model may be trained to draw correlations between various words and/or phrases and sensitive data. In some cases, the words and/or phrases identified by the parsing module 118 may be provided as input to the trained machine learning model to identify data that is likely (e.g., has a degree of likelihood over a threshold value) to be sensitive in nature.

A data replacement module 122 may be, when executed in conjunction with one or more processors, configured to update the email communication by replacing any sensitive data with a link that references a location in memory. In embodiments, this may involve storing data determined to be sensitive by the sensitive data detection module 120 in a memory location (e.g., within a datastore 114) hosted at a data host provider 116. Upon storing the data in the memory location, that data is then replaced with a reference link (e.g., a uniform resource locator (URL)) within the communication.

In embodiments, the service provider 108 may be configured to replace sensitive data within an email communication with a link to the sensitive data as stored in a secure location. The service provider 108 is configured to perform this replacement as the email communication is received. In embodiments, in order to access the sensitive data within the datastore 114 of the data host provider 116, the user may be required to be authorized. In some cases, such authorization may be provided via a hash generated from a user identification of the user attempting to access the sensitive data. In some cases, the hash may be further generated using a secret key associated with the user.

In some embodiments, the link to the sensitive data may only be accessed by a computing device 104 that is authorized to access such a link. For example, only computing devices 104 associated with (e.g., registered to) a particular user or organization (e.g., business organization) may be provided access to the memory location at which the sensitive data is located. In this example, the user may only be able to access the sensitive data from such an authorized computing device (e.g., a work computer). In some embodiments, the link may be associated with a particular account (e.g., an account determined to be associated with the intended recipient). In such cases, the user may be required to provide login credentials (e.g., a login and password associated with the account) in order to access the sensitive data in the memory location.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
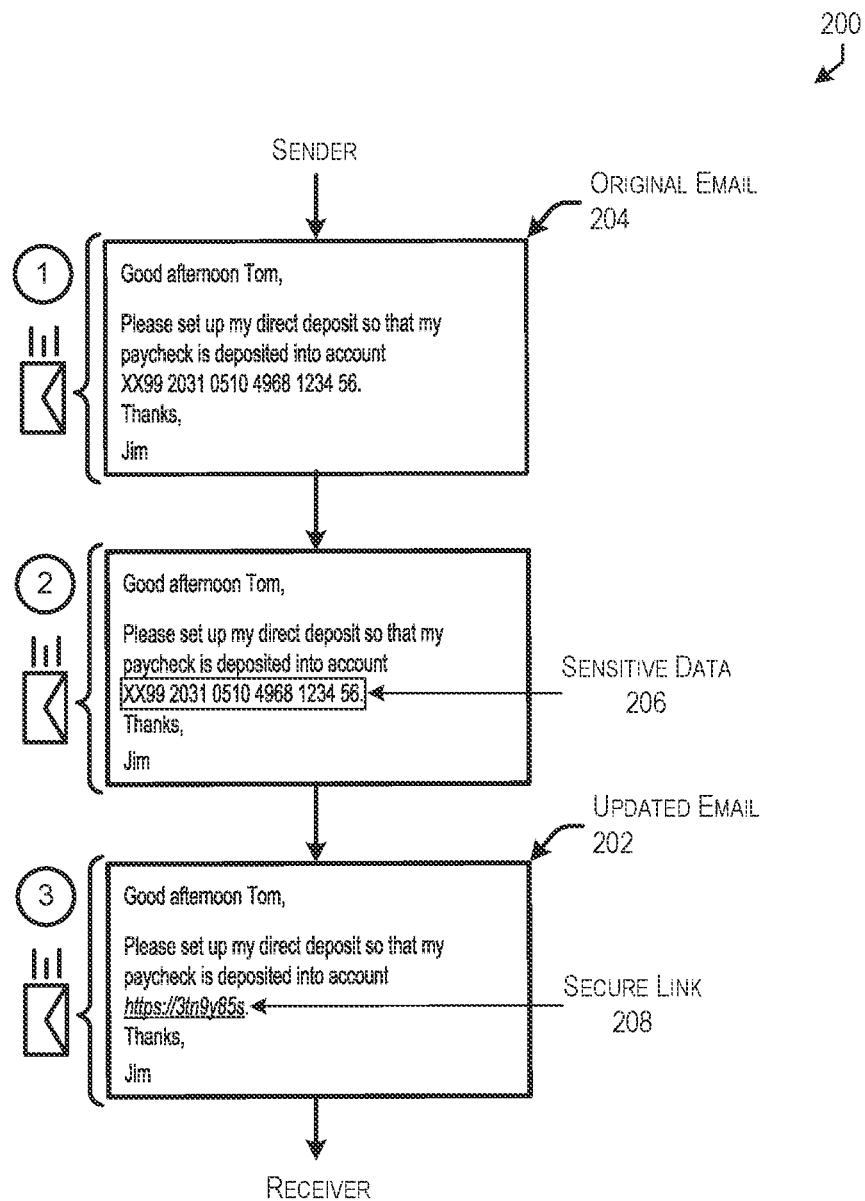
FIG. 2 depicts a block diagram illustrating an example process for generating an updated email from an original email by replacing sensitive data with a secure link in accordance with at least some embodiments.

FIG. 2 depicts a block diagram illustrating an example process for generating an updated email 202 from an original email 204 by replacing sensitive data with a secure link in accordance with at least some embodiments. The process 200 illustrated in FIG. 2 may be performed by a service provider computing device, such as the service provider computing device 108 as described with respect to FIG. 1 above.

At step 1 of the process 200, an email communication is received from a sender to be delivered to a receiver. The email communication may include any suitable combination of text data and graphical data (e.g., images). In some cases, the email may include an attachment, such as a word or image document.

Upon receiving the email communication at step 1, the disclosed system may be configured to parse the contents of that email. In some embodiments, the disclosed system may also be configured to parse the contents of an attachment (e.g., an attached text-based document). When parsing the email communication, the system may identify individual words and/or phrases included in the email communication as well as relationships between those words and/or phrases.

At step 2 of the process 200, sensitive data 206 may be identified within the email communication. In some embodiments, the words and/or phrases identified at step 1 may be provided as input to one or more machine learning models that have been trained to identify sensitive data. In some embodiments, a type or category of sensitive data may be determined (e.g., Personal Identifiable Information (PII), financial account data, etc.). In some cases, a determination may be made about a degree of sensitivity of any identified sensitive data. Whether a particular piece of data is determined to be sensitive data or not may depend on one or more policies maintained by the system in relation to an organization to which the target receiver of the communication and/or a sender of the communication belongs. For example, information may be maintained about a type or category of sensitive data that is to be obfuscated or a degree of sensitivity of the potential sensitive data. For example, data may be identified as being sensitive data if a degree of sensitivity associated with the data is greater than a threshold degree of sensitivity.

At step 3 of the process 200, an updated email 202 may be generated by obfuscating sensitive data within the communication. In some cases, such obfuscating may involve replacing any identified sensitive data 206 within the communication with a secure link 208 to a memory location in which the sensitive data is stored.

In some embodiments, information included within each piece of sensitive data 206 identified at step 2 of the process 200 may be stored in a secure location at a remote server (e.g., data host provider 116). In some embodiments, the sensitive data stored in memory may be secured. In some cases, this may involve encrypting the sensitive data using a cryptographic algorithm and a cryptographic key (e.g., a public cryptographic key) associated with the target receiver of the communication. In some cases, the sensitive data may be secured via the use of a secure hash generated from information about the receiver and/or sender. For example, an identifier for the sender may be used to generate a first hash using a first hashing algorithm and an identifier for the receiver may be used to generate a second hash using a second hashing algorithm. In this example, the sensitive data stored at the remote server may be secured via a third hash generated from the first hash and the second hash.

Figure 3:
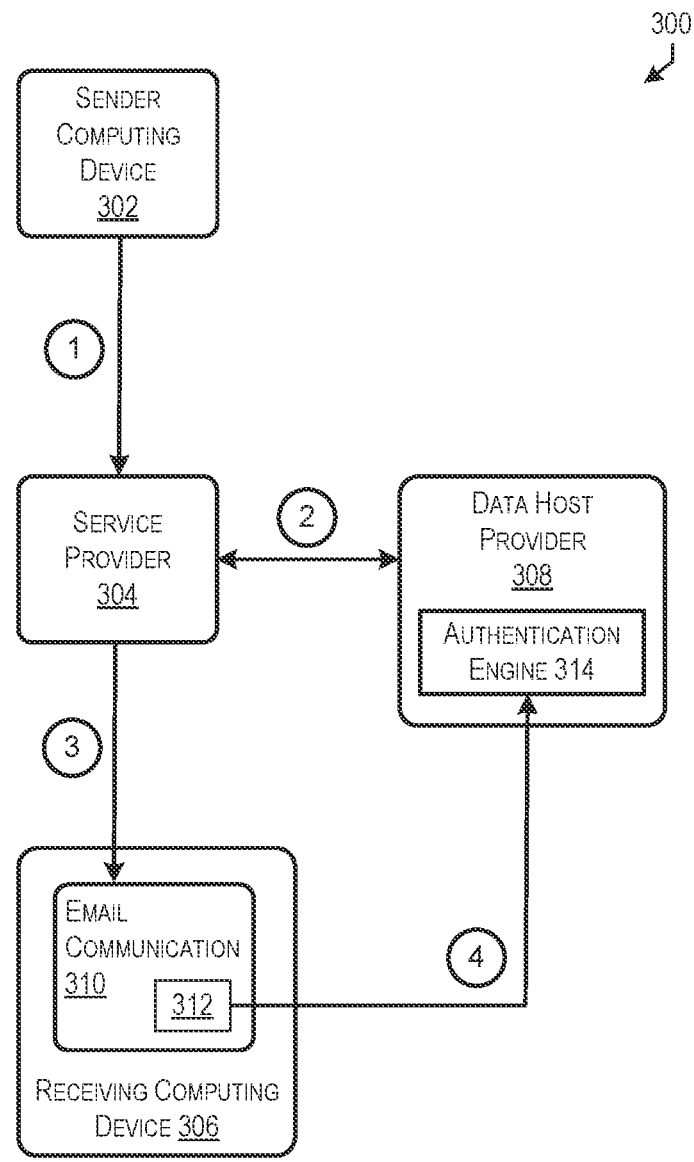
FIG. 3 depicts a block diagram illustrating an example process for providing a receiver of an email with access to sensitive data at a secure memory location in accordance with at least some embodiments.

FIG. 3 depicts a block diagram illustrating an example process for providing a receiver of an email with access to sensitive data at a secure memory location in accordance with at least some embodiments. In embodiments, the process 300 may involve interactions between a number of computing devices, including a sender computing device 302, a service provider computing device 304, a receiving computing device 306, and a data host provider computing device 308.

At step 1 of the process 300, the service provider computing device 304 receives an electronic communication (e.g., email) originating at a sender computing device 302. In some embodiments, the service provider computing device 304 is implemented on, or alongside, a server computing device that performs email routing. Upon receiving such an electronic communication 310, the service provider 304 may identify one or more pieces of sensitive data within that communication.

At step 2 of the process 300, the content of the one or more pieces of sensitive data may be provided to a data host provider 308 to be stored in a secure memory location. In some cases, the location in memory at which the content of the sensitive data is stored may be associated with an index or other reference to the communication itself. In one example, such an index may include some version of a user identifier, such as a user identifier for the sending computing device 302.

The service provider computing device 304 may generate a link (or other suitable reference) 312 that references the location of the sensitive data in memory of the data host provider computing device 308. In some cases, separate links 312 may be generated for each of multiple identified sensitive data. In some cases, such a link might be a uniform resource locator (URL) or other suitable form of location reference.

Additionally, the service provider computing device 304 may be configured to delete or otherwise remove the sensitive data from the communication 310. In some cases, the sensitive data, upon being removed, is replaced with the generated link 312. For example, the link 312 may be placed within the communication 310 at the location that was previously occupied by the sensitive data. In some cases, a link 312 may be generated that references a location in memory at which all of the sensitive data identified within the communication 310 is stored.

At step 3 of the process 300, the email communication 310 is forwarded to the receiving computing device 306 to which it is targeted. Upon receiving the email communication 310, that communication may be presented to a user associated with an email account to which the communication is targeted.

At step 4 of the process 300, a user may access the link 312 included within the email communication 310. Upon accessing the link 312, the receiving computing device 306 is directed to the memory location at the data host provider computing device 308. It should be noted that in some cases, the sensitive data stored by the data host provider computing device 308 may encrypted (or otherwise cryptographically secured) such that it may be made accessible using a cryptographic key (e.g., a private cryptographic key) available to the receiving computing device 306.

Upon accessing the memory location, a determination may be made as to whether the user that clicked on the link 312 has authority to view the sensitive data stored at the memory location. In some embodiments, such a determination may be made by an authentication engine 314 implemented by the host provider 308. In some cases, the determination may be made based on the user providing access credentials (e.g., a login and password). In some cases, the receiving computing device 306 may be configured to provider access credentials to the data host provider computing device 308 automatically (e.g., without user intervention) upon the user attempting to access the memory location. In some implementations of these embodiments, such access credentials may include a value that is generated independently by the receiving computing device 306. For example, such an access credential might be a hash value that is generated from one or more values included in the email communication 310 (e.g., within a header of the email communication) as well as information available to (and secret to) the receiver of the communication (e.g., an email account and/or receiving computing device). In this example, a hash value provided as an access credential may be generated based on an identifier for a sender of the communication, an identifier for a receiver of the communication, and a secret key, or other value, maintained by the receiver.

Figure 4:
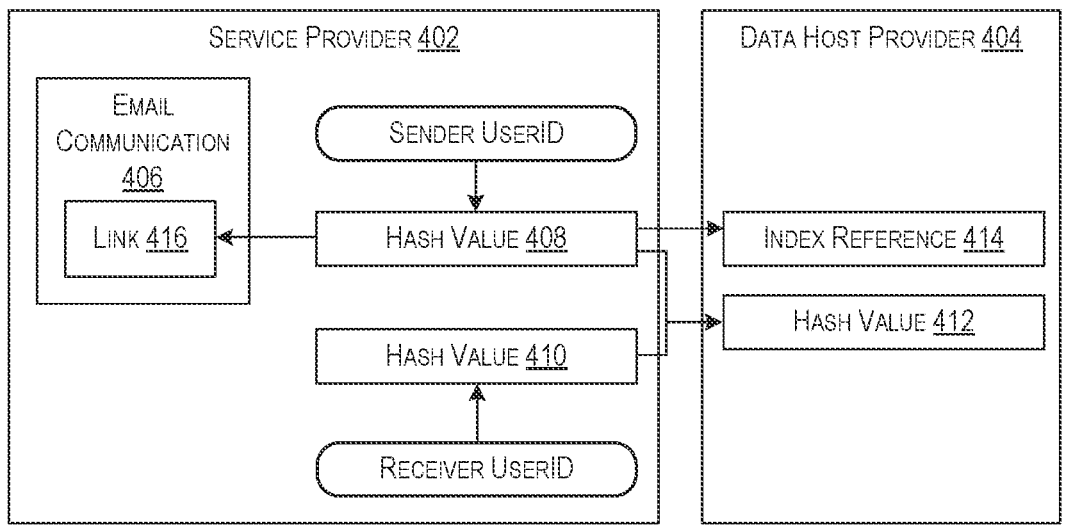
FIG. 4 depicts a block diagram illustrating an example process for securing sensitive data at a data host provider using hashing techniques in accordance with at least some embodiments.

FIG. 4 depicts a block diagram illustrating an example process for securing sensitive data at a data host provider using hashing techniques in accordance with at least some embodiments. As depicted, the process 400 may be performed by a service provider computing device 402 in communication with a data host provider computing device. The process 400 is performed by the service provider computing device 402 upon receiving an email communication 406. As noted elsewhere, the service provider 402 is configured to identify sensitive data within the email communication to be stored at a memory location of the data host provider 404. The process 400 may be performed in order to manage access to the sensitive data stored at the memory location.

In embodiments, the service provider 402, while performing the process 400 to store identified sensitive data from an email communication, may access information included in the email communication (e.g., as indicated in a header) to be used in storing and securing sensitive data included within the email communication 406.

The service provider 402 may generate a number of data values that can be used for authentication of a user attempting to access the secure memory location. Such data values might include hash values (e.g., hash values 408, 410, and 412). In some embodiments, the service provider may generate multiple hash values to provide more accurate authentication of a user attempting to access the sensitive data. For example, the service provider may generate a first hash value 408 from information about the sender of the email communication (e.g., a sender user identifier) as well as a second hash value 410 from information about the receiver of the email communication (e.g., a receiver user identifier). It should be noted that the second hash value 410 generated from information about the receiver of the email communication may also be generated using information that is secret to the receiver. For example, the second hash value may be generated using a secret key that is associated with, or otherwise maintained on behalf of, the receiver of the communication. In this example, the secret may be independently maintained by both the service provider 402 and the receiver.

In some cases, the service provider 402 may be configured to generate a third hash value 412 from the first hash value 408 and the second hash value 410. In these cases, the third hash value 412 may be provided to the data host provider 404 to be stored in relation to the sensitive data. In such cases, the third hash value 412 can be compared to a data value provided by a user attempting to access the sensitive data in order to authenticate the user attempting to access the sensitive data. If the data value provided by the user (which may be independently generated by the user) matches the third hash value 412, then the user may be authenticated and may be granted access to the sensitive data.

In embodiments, the first hash value 408 is either provided to the receiver of the communication 406 or it is capable of independent generation by such a receiver. In some cases, the first hash value 408 may act as, or be used to generate, an index reference 414 that can be used to identify the location at the data host provider 404 at which the sensitive data is stored. As noted elsewhere, the service provider 402 may produce a link 416 to the location at the data host provider 404 in which the sensitive data is located. In some cases, the link 416 may include an indication of the first hash value 408, such that the text information of such a link 416 can be used to independently generate a third hash value 412 to be used to authenticate a user attempting to use the link 416 to access sensitive data.

Figure 5:
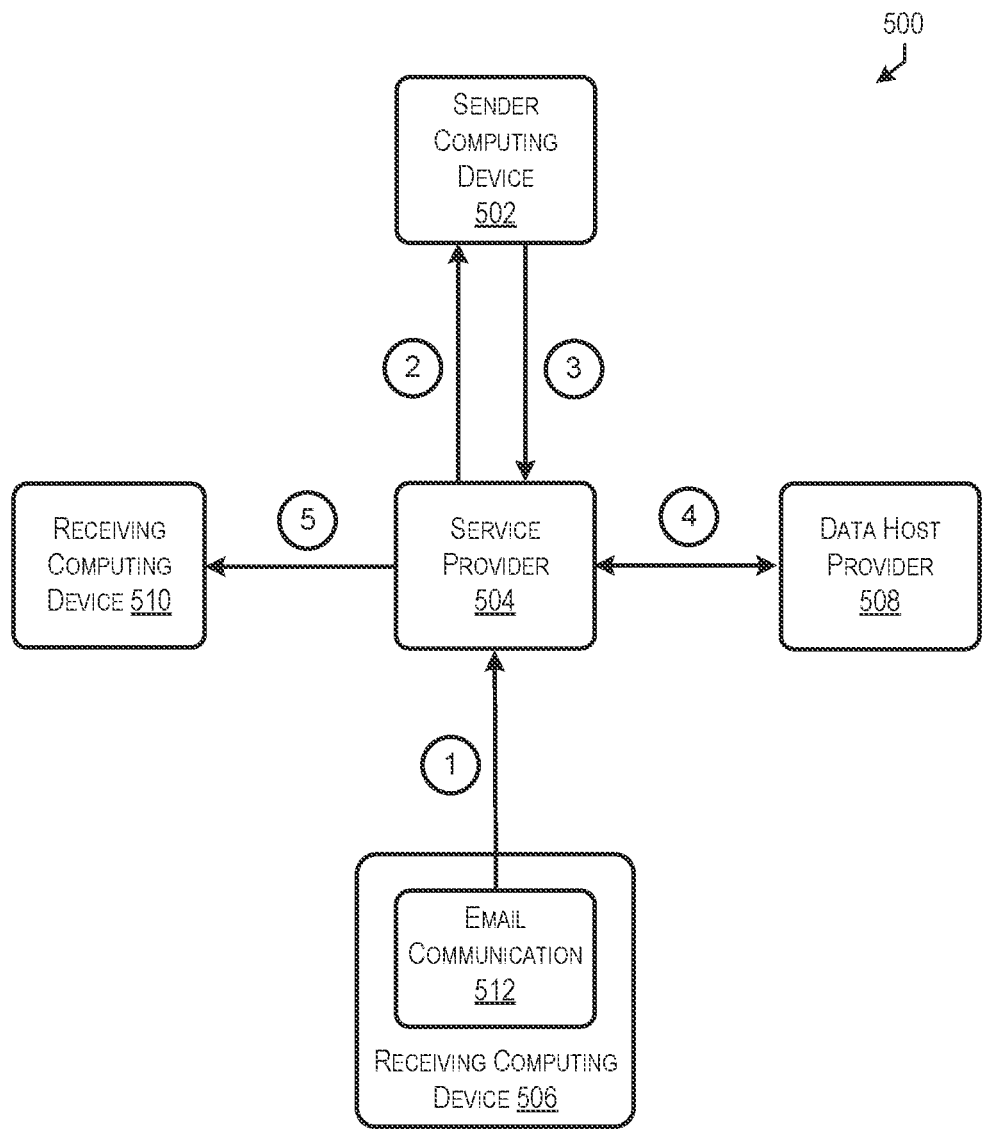
FIG. 5 depicts a block diagram illustrating an example process for managing access to sensitive data stored at a secure memory location in accordance with at least some embodiments.

FIG. 5 depicts a block diagram illustrating an example process for managing access to sensitive data stored at a secure memory location in accordance with at least some embodiments. In embodiments, the process 500 may involve interactions between a number of computing devices, including a sender computing device 502, a service provider computing device 504, a first receiving computing device 506, a data host provider computing device 508, and a second receiving computing device 510. It should be noted that the process 500 may be performed subsequent to performance of the process 300 as described in relation to FIG. 3 above. In other words, the process 500 may be performed after a user of the first receiving computing device 506 has received an email communication 512 in which sensitive data has been replaced with a link to a memory location at a data host provider 508. More particularly, the process 500 may be performed when a user of the receiving computing device 506 forwards the email communication 512 to a second receiving computing device 510.

At step 1 of the process 500, a user of the receiving computing device 506 forwards the email communication 512 to a second receiving computing device 510. Upon receiving an email communication 512 to be forwarded to a second computing device 510, the service provider 504 may make a determination that sensitive data was previously removed from the email communication by the service provider 504. Upon making this determination, the service provider 502 may identify the sensitive data stored at the data host provider.

Additionally, the service provider 504 may be configured to identify a number of intended recipients of the forwarded email communication. Upon identifying the number of recipients, the service provider 504 may be configured to make a determination about whether those intended recipients are authorized to access the sensitive data originally included within the email. In some cases, if individuals of the intended recipients were not included as recipients in the original email received by the first receiving computing device 506 (e.g., before performance of the process 500), then a determination may be made that those individuals are not currently authorized to access the sensitive data.

At step 2 of the process 500, and upon making a determination that one or more individuals of the intended recipients of the email communication 512 is not authorized to access the sensitive data, the service provider 504 may provide a notification to an originator of the communication requesting authorization for the one or more individuals. In some cases, this may involve providing a Short Messaging Service (SMS) notification to a computing device 502 associated with the sender, which might be a mobile device. In some cases, the notification may include a list of the one or more individuals that are to be given authorization to access the sensitive data. In other cases, the notification may request permission to allow the receiver of the email (e.g., the original intended recipient) to grant authorization to other individuals to view the sensitive data.

At step 3 of the process 500, and upon the sender computing device 502 receiving the notification at step 2, the user of the sender computing device 502 (e.g., the sender) may provide a response to the notification. In some cases, the user may provide an indication as to whether the individuals identified in the notification who should or should not be granted authorization to access the sensitive data. In some cases, the user may be presented, within the notification, with an indication of multiple individuals to which the email is to be forwarded and may provide an indication of a selection from the one or more individuals that are to be given authorization to view the sensitive data.

At step 4 of the process 500, upon receiving an indication from the sender computing device 502 that one or more individuals should be granted access to the sensitive data, the service provider 504 may update one or more permissions stored in relation to the sensitive data stored at the data host provider 508. In some cases, this may involve providing one or more additional access credentials that can be used to access the sensitive data. For example, where the access credential is a hash value (as described in relation to FIG. 4 above) one or more additional hash values may be provided to the data host provider 508, each of which can be used to authenticate a user attempting to access the sensitive data. In this example, a separate additional hash value may be provided for each of the individuals to be granted access to the sensitive data. Upon receiving a request to access the sensitive data, the data host provider would, in this example, compare a hash value received from the requesting entity against each of the hash values stored in relation to being granted access to the sensitive data. Access would be granted if the received hash value matches any of the stored hash values.

At step 5 of the process 500, the email communication is forwarded to a second receiver via a second receiving computing device 510. In some cases, the email communication is forwarded to each additional recipient whether the sender has granted access to that recipient or not. In such cases, the additional recipient might be able to read the email communication but would be unable to access the sensitive data at the host data provider 508. In some cases, the email communication may be prevented from being forwarded to intended recipients that the original sender has indicated should not be granted access to the sensitive data.

Figure 6:
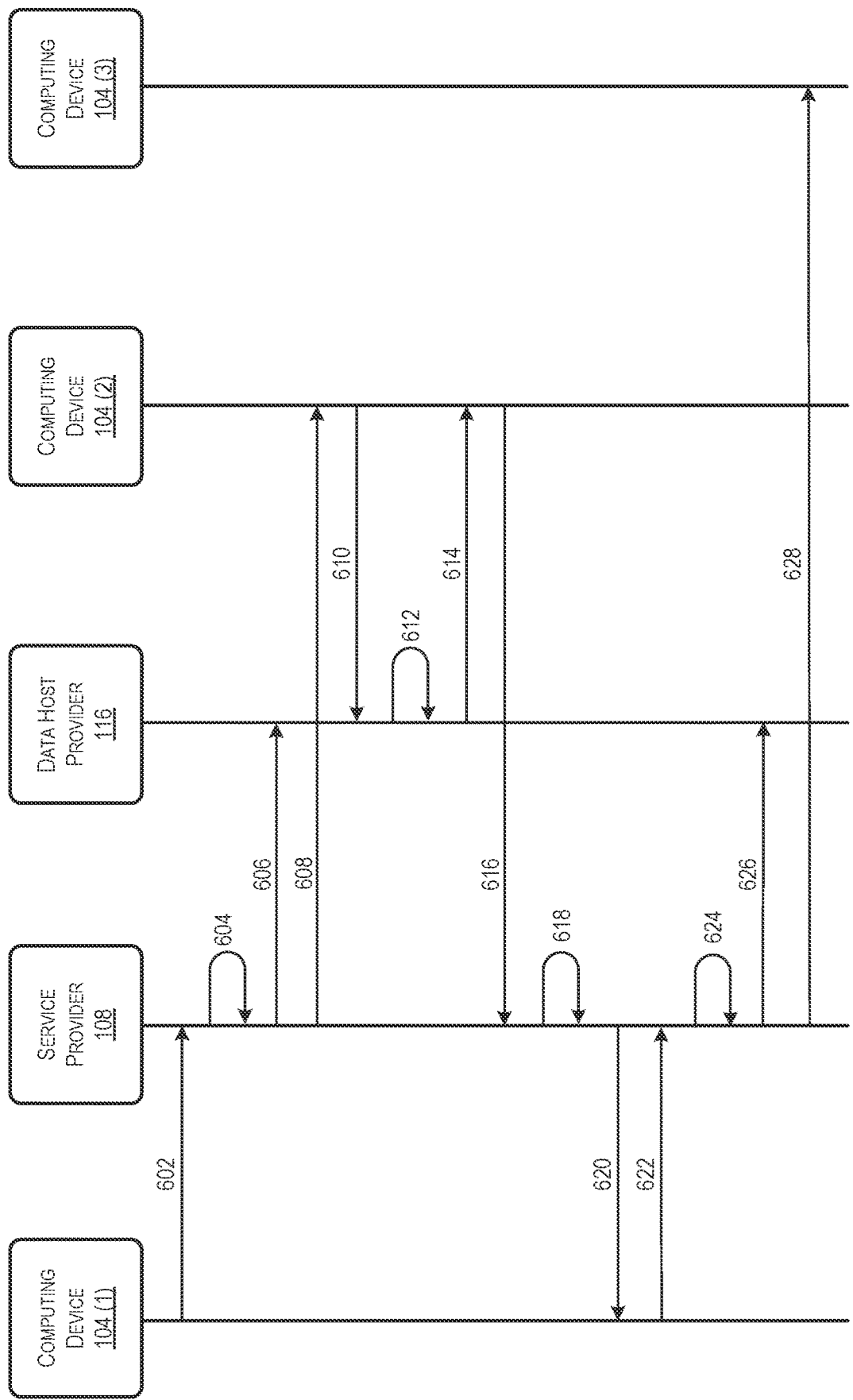
FIG. 6 depicts a swim lane diagram illustrating a process for securing, and managing access to, sensitive data detected within a communication in accordance with at least some embodiments.

FIG. 6 depicts a swim lane diagram illustrating a process for securing, and managing access to, sensitive data detected within a communication in accordance with at least some embodiments. In embodiments, the process 600 may involve interactions between a number of computing devices, including first, second, and third computing devices 104 (1-3), as well as a service provider 108, and a data host provider 116.

At 602, the process may involve receiving, at a service provider computing device 108, an electronic communication from a first computing device 104 (1). In one example, the electronic communication might include an email communication. In another example, the electronic communication might include a text message or other mobile communication-network-based communication. In embodiments, the electronic communication may be associated with at least two accounts, including a sender account and at least one intended recipient account.

At 604, the process may involve managing, by the service provider computing device 108, access to sensitive data within the electronic communication. This may first involve identifying, within the electronic communication one or more pieces of sensitive data. In some cases, sensitive data is identified using one or more machine learning models trained to correlate text or image input with sensitive data. In such cases, the text and/or images of the electronic communication may be parsed and provided as input to the trained machine learning model. In some embodiments, the trained machine learning model may further take into consideration a relationship between the text and/or images in the electronic communication.

In some cases, sensitive data may be identified based on a format or content of the sensitive data. For example, the service provider 108 may maintain information about a number of different types or categories of sensitive data (e.g., PII, financial account data, etc.). In this example, the service provider 108 may identify sensitive data by virtue of identifying data within the communication that is structured in a manner that fits one or more formats indicated as being associated with a category of sensitive data. In some cases, contextual information (e.g., words and/or phrases presented in the electronic communication) may also be used to identify sensitive data. For example, if the electronic communication includes the phrase "social security number" and a piece of data included in the electronic communication is structured in a manner that matches a format associated with a social security number, then that piece of data may be flagged as potentially being a social security number.

At 606, upon identifying sensitive data within the electronic communication, the process may involve providing the sensitive data to a data host provider 116 to be independently maintained. As noted elsewhere, the service provider may identify sensitive data within a received electronic communication (e.g., as described in relation to 604).

In some embodiments, the service provider 108 may, at 606, further provide information to the data host provider 116 to be used to gain access to the sensitive data stored in the secure location. For example, the service provider 108 may generate and provide one or more access credentials that can be used to gain access to the content of the sensitive data as stored in the secure memory location of the data host provider 116. In this example, such access credentials may include a hash value generated from information maintained about the sender and/or receiver of the electronic communication. Note that a hash value is generated by subjecting information to a hashing algorithm. In some cases, a first hash value may be generated based on a user identifier for the sender, a second hash value may be generated based on a user identifier for the receiver, and a third hash value (which may be used as an access credential) may be generated from the first hash value and the second hash value.

Once an access credential (e.g., a hash value as described above) has been generated, it may be provided to the data host provider to be used in managing access to the sensitive data stored in the secure memory location. Note that where the electronic communication is directed toward multiple recipients, a separate access credential may be generated for each different intended recipient of the electronic communication. In this scenario, any of the multiple generated access credentials may be used to access the sensitive data at the data host provider 116. In some cases, one or more of the hash values may be used to reference the memory location in order to provide a higher degree of security. For example, an index might be generated to reference the memory location based on one or more of the hash values.

At 608, the process may involve providing an updated version of the electronic communication to a second computing device 104 (2) used to access an account associated with at least one intended recipient of the electronic communication. As described above, upon identifying sensitive data within the electronic communication, the service provider may obtain the content of the sensitive data and provide that content to the data host provider 116 to be stored in a secure memory location hosted by the data host provider. The service provider 108 may then generate an updated version of the electronic communication by replacing the sensitive data with a link (or other reference) to the secure memory location. This updated version of the electronic communication is the one provided at 608.

At 610, at least one recipient of the electronic communication may attempt to access the sensitive data stored in the memory location. In some cases, this may involve a user of the second computing device 104 (2), upon being presented the content of the electronic communication, may click on (or otherwise select) a link to the memory location as included in the electronic communication.

At 612, the process may involve determining whether to grant access to the content of the sensitive data stored in the memory location upon receiving the request to access that memory location. In some embodiments, such a determination may be made based on whether the user is authenticated. In other words, such a determination may be made based on whether access credentials provided by the computing device 104 (2) along with the request to access the memory location match at least one access credential stored in association with the sensitive data/memory location (e.g., provided to the data host provider 116 at 606). In some cases, such access credentials may be generated independently by the second computing device 104 (2) upon contacting the data host provider 116.

At 614, the process may involve either providing or declining to provide the content of the sensitive data to the requesting user based on whether the user is authenticated at 612. In some embodiments, the content may be provided to the second computing device 104 (2) to be presented on a display of that computing device.

At 616, the process may involve receiving an indication that the electronic communication is being forwarded by the original recipient to at least one second recipient.

At 618, upon receiving the electronic communication to be forwarded to the second recipient, the process may involve determining whether the second recipient should be granted access to the sensitive data stored in the memory location. In some embodiments, such a determination may be made automatically based on a role of the second recipient and/or relationship between the second recipient and either the sender or original recipient. In some embodiments, such a determination may be made based on an indication received from the sender of the electronic communication.

In embodiments, in which such a determination is made based on an indication received from the sender of the electronic communication, at 620 the process may involve providing a notification to the sender. In some cases, the notification may be provided to an account associated with the sender, which may be accessed on the first computing device 104 (1) or any other suitable computing device capable of being used to access information for that account. In some embodiments, the service provider may maintain a mapping between electronic communication accounts and corresponding mobile devices. In this example, the notification may be provided to a mobile device associated with the sender.

The notification may be presented to the sender on a display of the computing device 104 (1) to which the notification is provided. The notification may include some combination of an indication of the original sender that is forwarding the electronic communication, an indication of the sensitive data (or a category or type of associated with the sensitive data) to be accessed, or an indication of the second recipient. Upon being presented this information, the sender can respond to the notification by providing an indication as to whether the second recipient should be granted access to the sensitive data. At 622, the process may involve receiving, at the service provider, an indication of whether the second recipient should be granted access to the sensitive data.

At 624, the process may involve, upon determining that the second recipient should be granted access to the sensitive data, generate information that can be used by the second recipient to access that sensitive data. For example, the service provider may provide at least one additional access credential to be associated with the second recipient that may be used to access the sensitive data. In this example, the service provider might generate an additional hash value generated from information maintained about the sender and/or second receiver of the electronic communication. In some cases, a first hash value may be generated based on a user identifier for the sender, a second hash value may be generated based on a user identifier for the second receiver, and a third hash value (which may be used as the access credential) may be generated from the first hash value and the second hash value.

At 626, the service provider 108 may provide the generated additional access credential to the data host provider 116 to be stored in relation to the sensitive data/memory location. The data host provider 116 may then store the received additional access credential along with any existing access credentials for the sensitive data. When a request is received to access the sensitive data, any of these access credentials may be used to authenticate the user requesting that access.

At 628, the process may involve routing the forwarded electronic communication to a third computing device 104 (3) used to access an account associated with the second recipient of the electronic communication. The second recipient may then attempt to access the sensitive data on the third computing device 104 (3) by clicking on the link in the electronic communication. Upon the second recipient clicking on this link, the third computing device 104 (3) is caused to communicate with the data host provider 116 to access the memory location. The third computing device 104 (3) may independently generate an access credential to be used to gain access to the memory location. In this scenario, the second recipient may be authenticated (and subsequently granted access to the sensitive data in the memory location) upon determining that the generated access credential matches one of those stored in association with the memory location.

Figure 7:
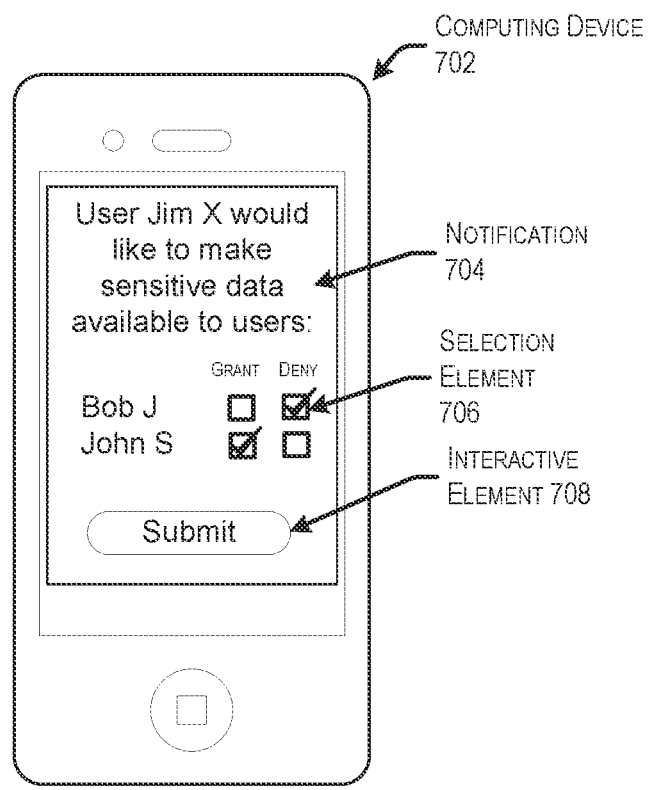
FIG. 7 depicts a graphical user interface that illustrates an example of a notification that may be provided to an originator of a communication to extend secure access to sensitive data in accordance with at least some embodiments.

FIG. 7 depicts a graphical user interface that illustrates an example of a notification that may be provided to an originator of a communication to extend secure access to sensitive data in accordance with at least some embodiments. As noted elsewhere, when an original receiver of an email communication forwards that email communication to at least one second receiver, the original sender of the email may be notified in order to obtain authorization for the at least one second receiver to access sensitive data originally included in the email communication. In some cases, this may involve identifying a computing device associated with the original sender and providing a notification to that computing device.

As depicted in FIG. 7, a sender of an email communication may be associated with a computing device 702. Note that such an association may be independent of any use of an email application on that user device. In other words, the sender of an email communication may be associated with a computing device (e.g., a mobile device or other portable electronic device) regardless of whether that computing device was used to send the email communication.

In embodiments, if an email communication that originated from a sender associated with the computing device is subsequently forwarded by the original recipient to at least one second recipient, a notification 704 may be provided to the computing device 702, which may subsequently be displayed on the computing device 702 via a graphical user interface (GUI). Such a notification 704 may include a list of multiple second recipients to which the email communication is being forwarded. It should be noted that such a notification 704 may be provided in parallel to the email communication being routed to the second recipient. For example, the email communication may be received by the at least one second recipient before a response to the notification 704 is received.

In some embodiments, the notification 704 may include at least an indication (e.g., a list) of the at least one second recipient to which the email communication is being forwarded. In some cases, the indication of the at least one second recipient may include a selection element 706 that enables a user of the computing device 702 to select one or more of the at least one second recipient that is to be granted or denied access to the sensitive data included in the original email communication. In some embodiments, the selection element 706 may enable a user to make a selection of which, if any, potential recipients of the email are to be granted access to the sensitive data.

In embodiments, upon being presented with the notification 704, the user of the computing device 702 may make a selection of one or more of the potential recipients of the forwarded email communication via a selection element 706 associated with each of the potential recipients. Upon completing the selection of which recipients should be granted access to the sensitive data, the user may submit the selection to the service provider by interacting with an interactive element 708, such as a button. It should be noted that even if one or more of the potential recipients is indicated as not having authority to access the sensitive data, that recipient may still receive the email. In this scenario, that recipient may simply not be provided access to the sensitive data if he or she attempts to access that sensitive data.

Figure 8:
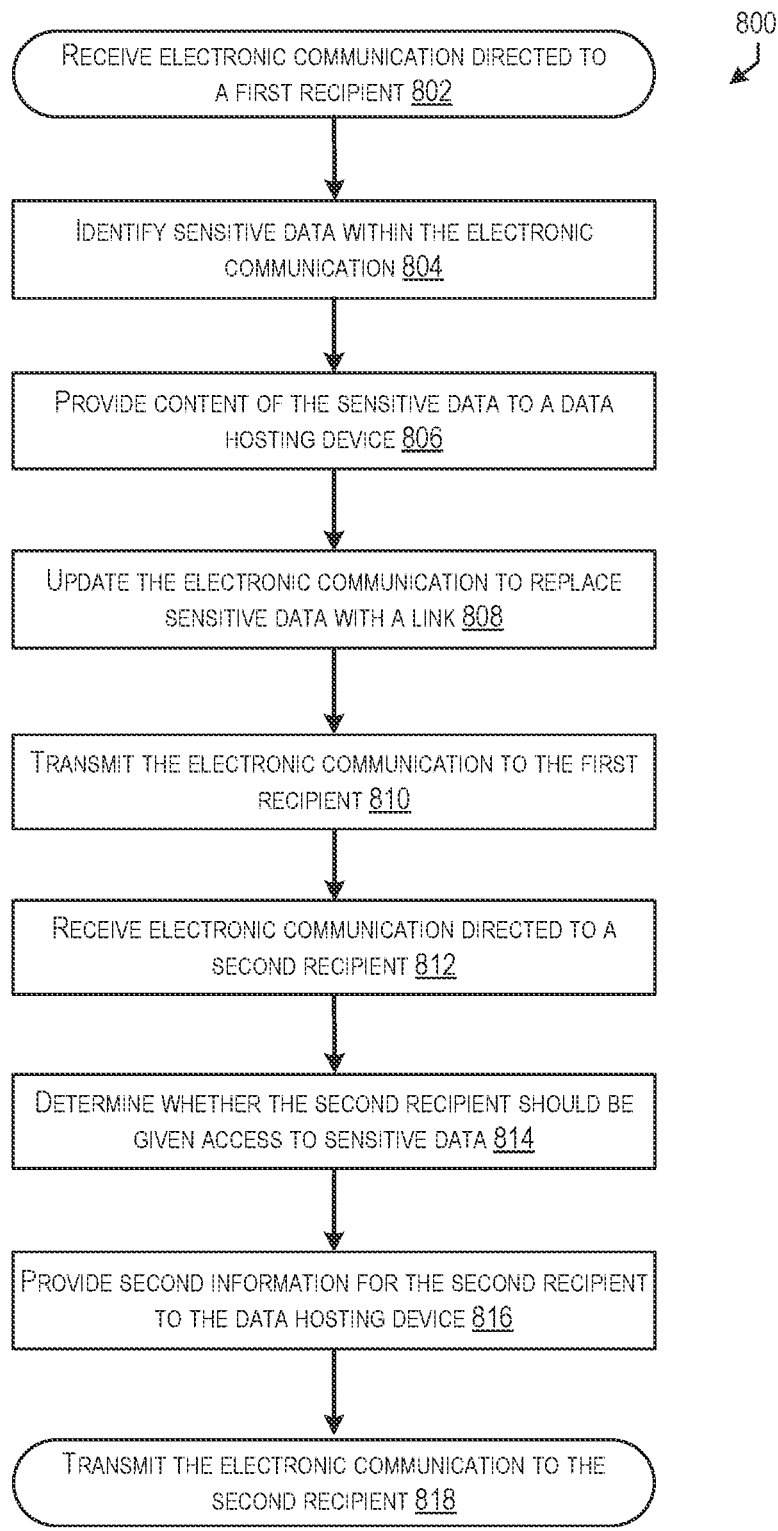
FIG. 8 depicts a flow diagram illustrating an exemplary process for managing access to sensitive data included in an electronic communication in accordance with at least some embodiments.

FIG. 8 depicts a flow diagram illustrating an exemplary process for managing access to sensitive data included in an electronic communication in accordance with at least some embodiments. The process 800 may be performed by a service provider computing device acting as an email server, such as the service provider 108 as described in relation to FIG. 1 above.

At 802, the process 800 may involve receiving, from a sender, an electronic communication directed toward a first recipient. In some cases, an electronic communication may be an email communication associated with a sender account and directed toward a recipient account. In other cases, an electronic communication may be a text message (e.g., an SMS message) or another suitable communication transmitted over a mobile network.

At 804, the process 800 may involve identifying one or more pieces of sensitive data within the electronic communication. In some embodiments, sensitive data is identified using one or more machine learning models trained to correlate text or image input with sensitive data. In such cases, the text and/or images of the electronic communication may be parsed and provided as input to the trained machine learning model. In some embodiments, the trained machine learning model may further take into consideration a relationship between the text and/or images in the electronic communication.

At 806, the process 800 may involve providing a content of the one or more pieces of sensitive data to a data hosting device to be stored in a memory location and first information associated with the first recipient used to access the memory location. In some embodiments, the first information is a first hash value generated based on information about at least one of the sender or the first recipient. In some of these embodiments, the first hash value is generated from a second hash value generated based on information about the sender and a third hash value generated based on information about the first recipient.

At 808, the process 800 may involve updating the electronic communication to replace the one or more pieces of sensitive data with a reference to the memory location. For example, the sensitive data may be replaced by a uniform resource locator (URL) that points to the memory location. In some embodiments, the memory location is hosted by a data host provider computing device that is separate from the service provider computing device. At 810, the process 800 may involve transmitting the electronic communication to the first recipient.

In some embodiments, the process 800 may further involve receiving, from a computing device, a request to access the sensitive data at the memory location. In these embodiments, the request is generated upon user interaction with the reference to the memory location within the electronic communication. In these embodiments, the process 800 may further involve determining whether to grant the access to the sensitive data and upon determining that the computing device is to be granted access to the sensitive data, providing the computing device with access to the sensitive data. In these embodiments, determining whether to grant the access to the sensitive data may involve determining whether a second information provided by the computing device in the request matches the first information. Such second information may be independently generated by the computing device upon generating the request to access to the sensitive data.

At 812, the process 800 may involve receiving, from the first recipient, the electronic communication directed toward a second recipient. For example, the first recipient may elect to forward the electronic communication to a second recipient.

At 814, the process 800 may involve determining whether the second recipient should be granted access to the sensitive data. In some embodiments, determining whether the second recipient should be granted access to the sensitive data may involve determining whether a role or relationship associated with the second recipient is authorized to access the sensitive data. In some embodiments, determining whether the second recipient should be granted access to the sensitive data may involve providing a notification to the sender, receiving a response to the notification from the sender, and making a determination as to whether the second recipient should be granted access to the sensitive data based on information included in the response to the notification.

At 816, the process 800 may involve providing, to the data hosting device, second information associated with the second recipient used to access the memory location. In some embodiments, the second information is a hash value generated based on information about at least one of the sender or the second recipient. In some of these embodiments, the hash value is generated from a second hash value generated based on information about the sender and a third hash value generated based on information about the second recipient. At 818, the process 800 may involve transmitting the electronic communication to the second recipient.

Figure 9:
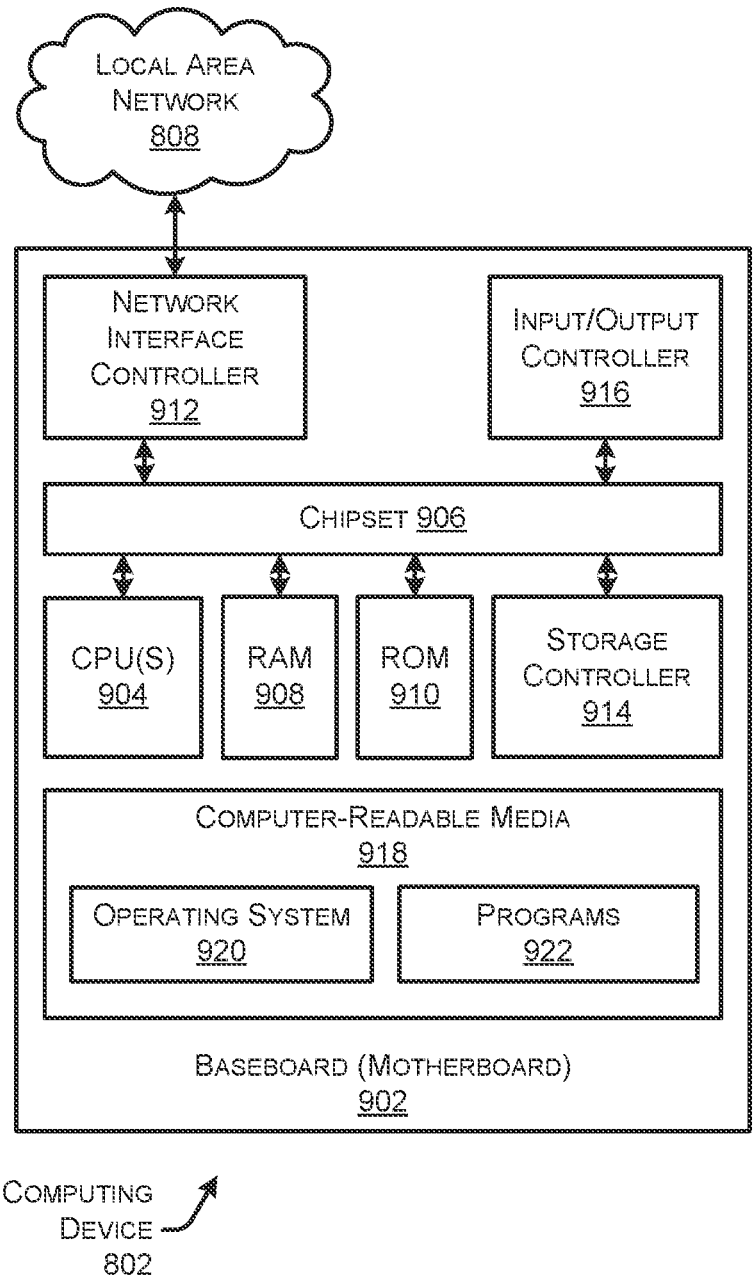
FIG. 9 shows an example computer architecture for a service provider computer 108 capable of executing program components for implementing the functionality described above.

FIG. 9 shows an example computer architecture for a service provider computer 108 capable of executing program components for implementing the functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein. The service provider computer 108 may, in some examples, correspond to a physical server as described herein, and may comprise networked devices such as servers, switches, routers, hubs, bridges, gateways, modems, repeaters, access points, etc.

The service provider computer 108 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the service provider computer 108.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 902. The chipset 906 can further provide an interface to a computer-readable storage medium such as a read-only memory ("ROM") 910 or non-volatile RAM ("NVRAM") for storing basic routines that help to startup the service provider computer 108 and to transfer information between the various components and devices. The ROM 910 or NVRAM can also store other software components necessary for the operation of the service provider computer 108 in accordance with the configurations described herein.

The service provider computer 108 can operate in a networked environment using logical connections to remote computing devices and computer systems through a network, such as the network 102. The chipset 906 can include functionality for providing network connectivity through a NIC 912, such as a gigabit Ethernet adapter. The NIC 912 is capable of connecting the service provider computer 108 to other computing devices over the network 102. It should be appreciated that multiple NICs 912 can be present in the service provider computer 108, connecting the computer to other types of networks and remote computer systems.

The service provider computer 108 can be connected to a storage device 918 that provides non-volatile storage for the computer. The storage device 918 can store an operating system 920, programs 922, and data, which have been described in greater detail herein. The storage device 918 can be connected to the service provider computer 108 through a storage controller 914 connected to the chipset 906. The storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The service provider computer 108 can store data on the storage device 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 918 is characterized as primary or secondary storage, and the like.

For example, the service provider computer 108 can store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The service provider computer 108 can further read information from the storage device 918 by detecting the physical states or characteristics of one or more particular locations within the physical storage units.

In addition to the mass storage device 918 described above, the service provider computer 108 can have access to other computer-readable storage media to store and retrieve information, such as program modules, data structures, or other data. It should be appreciated by those skilled in the art that computer-readable storage media is any available media that provides for the non-transitory storage of data and that can be accessed by the service provider computer 108. In some examples, the operations performed by devices as described herein may be supported by one or more devices similar to service provider computer 108. Stated otherwise, some or all of the operations performed by an edge device, and/or any components included therein, may be performed by one or more service provider computing devices 108 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 918 can store an operating system 920 utilized to control the operation of the service provider computer 108. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 918 can store other system or application programs and data utilized by the service provider computer 108.

In one embodiment, the storage device 918 or other computer-readable storage media is encoded with computer-executable instructions which, when loaded into the service provider computer 108, transform the computer from a general-purpose computing system into a special-purpose computer capable of implementing the embodiments described herein. These computer-executable instructions transform the service provider computer 108 by specifying how the CPUs 904 transition between states, as described above. According to one embodiment, the service provider computer 108 has access to computer-readable storage media storing computer-executable instructions which, when executed by the service provider computer 108, perform the various processes described above with regard to the other figures. The service provider computer 108 can also include computer-readable storage media having instructions stored thereupon for performing any of the other computer-implemented operations described herein.

The service provider computer 108 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the service provider computer 108 might not include all of the components shown in FIG. 9, can include other components that are not explicitly shown in FIG. 9, or might utilize an architecture completely different than that shown in FIG. 9.

As described herein, the service provider computer 108 may include one or more hardware processors 904 (processors) configured to execute one or more stored instructions. The processor(s) 904 may comprise one or more cores. Further, the service provider computer 108 may include one or more network interfaces configured to provide communications between the service provider computer 108 and other devices, such as the communications described herein as being performed by an edge device. The network interfaces may include devices configured to couple to personal area networks (PANs), wired and wireless local area networks (LANs), wired and wireless wide area networks (WANs), and so forth. More specifically, the network interfaces include the mechanical, electrical, and signaling circuitry for communicating data over physical links coupled to the network 102. The network interfaces may be configured to transmit and/or receive data using a variety of different communication protocols. Notably, a physical network interface may also be used to implement one or more virtual network interfaces, such as for virtual private network (VPN) access, known to those skilled in the art. In one example, the network interfaces may include devices compatible with Ethernet, Wi-Fi™, and so forth.

The programs 922 may comprise any type of programs or processes to perform the techniques described in this disclosure. The programs 922 may comprise any type of program that cause the service provider computer 108 to perform techniques for communicating with other devices using any type of protocol or standard usable for determining connectivity. These software processors and/or services may comprise a routing module and/or a Path Evaluation (PE) Module, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing module contains computer executable instructions executed by the processor to perform functions provided by one or more routing protocols. These functions may, on capable devices, be configured to manage a routing/forwarding table (a data structure) containing. e.g., data used to make routing forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing module may implement a process that consists solely of providing mechanisms necessary for source routing techniques. That is, for source routing, other devices in the network can tell the less capable devices exactly where to send the packets, and the less capable devices simply forward the packets as directed.

In various embodiments, as detailed further below, PE Module may also include computer executable instructions that, when executed by processor(s), cause service provider computer 108 to perform the techniques described herein. To do so, in some embodiments, PE Module may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, PE Module may employ one or more supervised, unsupervised, or semi-supervised machine learning models. Generally, supervised learning entails the use of a training set of data, as noted above, that is used to train the model to apply labels to the input data. For example, the training data may include sample data that has been labeled as normal or anomalous. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that path evaluation process can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted an undesirable behavior of a path, such as its delay, packet loss, and/or jitter exceeding one or more thresholds. Conversely, the false negatives of the model may refer to the number of times the model incorrectly predicted acceptable path behavior. True negatives and positives may refer to the number of times the model correctly predicted whether the behavior of the path will be acceptable or unacceptable, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANS (SD-WANs), traffic between individual sites is sent over tunnels. The tunnels are configured to use different switching fabrics, such as MPLS, Internet, 4G or 5G, etc. Often, the different switching fabrics provide different quality of service (QOS) at varied costs. For example, an MPLS fabric typically provides high QoS when compared to the Internet but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receiving, by a service provider computing device from a sender, an electronic communication directed toward a first recipient;
identifying, by the service provider computing device, one or more pieces of sensitive data within the electronic communication;
providing, by the service provider computing device, a content of the one or more pieces of sensitive data to be stored in a memory location and first hash value generated from first information associated with the sender and second information associated with the first recipient, the first hash value used to verify access to the memory location;
updating, by the service provider computing device, the electronic communication to replace the one or more pieces of sensitive data with a reference to the memory location;
transmitting, by the service provider computing device, the electronic communication to the first recipient;

receiving, by the service provider computing device, a request to access the memory location as well as a recipient identifier;
generating, by the service provider computing device, a second hash value based on the first information and the recipient identifier; and
determining, by the service provider computing device, whether to grant access in response to the request based on a comparison of the first hash value to the second hash value.

2. The method of claim 1, further comprising:
receiving, by the service provider computing device from the first recipient, the electronic communication directed toward a second recipient;
determining, by the service provider computing device, whether the second recipient should be granted access to the sensitive data;
providing, by the service provider computing device to a data hosting device, second information associated with the second recipient used to access the memory location; and
transmitting, by the service provider computing device, the electronic communication to the second recipient.

3. The method of claim 2, wherein determining whether the second recipient should be granted access to the sensitive data comprises determining whether a role or relationship associated with the second recipient is authorized to access the sensitive data.

4. The method of claim 2, wherein determining whether the second recipient should be granted access to the sensitive data comprises:
providing a notification to the sender;
receiving a response to the notification from the sender; and
making a determination as to whether the second recipient should be granted access to the sensitive data based on information included in the response to the notification.

5. The method of claim 1, wherein the first hash value is generated by hashing information about the sender and hashing information about the first recipient.

6. The method of claim 1, further comprising:
upon determining that the computing device is to be granted access to the sensitive data in response to the request based on a comparison of the first hash value to the second hash value, providing the computing device with access to the sensitive data.

7. The method of claim 1, wherein the second hash value is independently generated by the computing device upon generating the request to access to the sensitive data.

8. The method of claim 1, wherein the memory location is associated with a third hash value generated from the first information associated with the sender.

9. A service provider device comprising:
one or more processors; and
one or more non-transitory computer-readable media storing computer-executable instructions that, when executed by the one or more processors, cause the service provider device to perform operations comprising:
receiving, from a sender, an electronic communication directed toward a first recipient;
identifying one or more pieces of sensitive data within the electronic communication;
providing a content of the one or more pieces of sensitive data to be stored in a memory location and a first hash value generated from first information associated with the sender and second information associated with the first recipient used to access the memory location;
updating the electronic communication to replace the one or more pieces of sensitive data with a reference to the memory location;
transmitting the electronic communication to the first recipient;
receiving a request to access the memory location as well as a recipient identifier;
generating a second hash value based on the first information and the recipient identifier; and
determining whether to grant access in response to the request based on a comparison of the first hash value to the second hash value.

10. The service provider device of claim 9, wherein the operations further comprise:
receiving, from the first recipient, the electronic communication directed toward a second recipient;
determining whether the second recipient should be granted access to the sensitive data;
providing, to a data hosting device, second information associated with the second recipient used to access the memory location; and
transmitting the electronic communication to the second recipient.

11. The service provider device of claim 10, wherein determining whether the second recipient should be granted access to the sensitive data comprises determining whether a role or relationship associated with the second recipient is authorized to access the sensitive data.

12. The service provider device of claim 10, wherein determining whether the second recipient should be granted access to the sensitive data comprises:
providing a notification to the sender;
receiving a response to the notification from the sender; and
making a determination as to whether the second recipient should be granted access to the sensitive data based on information included in the response to the notification.

13. The service provider device of claim 9, wherein the first hash value is generated by hashing information about the sender and hashing information about the first recipient.

14. The service provider device of claim 9, wherein the operations further comprise:
upon determining that the computing device is to be granted access to the sensitive data in response to the request based on a comparison of the first hash value to the second hash value, providing the computing device with access to the sensitive data.

15. The service provider device of claim 9, wherein the second hash value is independently generated by the service provider device upon generating the request to access to the sensitive data.

16. One or more non-transitory computer-readable media storing computer-executable instructions that, when executed by one or more processors, cause the one or more processors to perform operations comprising:
receiving, from a sender, an electronic communication directed toward a first recipient;
identifying one or more pieces of sensitive data within the electronic communication;
providing a content of the one or more pieces of sensitive data to be stored in a memory location and a first hash value generated from information associated with the first recipient and information associated with the sender, the first hash value used to verify access the memory location;

updating the electronic communication to replace the one or more pieces of sensitive data with a reference to the memory location; and transmitting the electronic communication to the first recipient;

receiving a request to access the memory location along with a recipient identifier;

generating a second hash value based on the first information and the recipient identifier; and determining whether to grant access in response to the request based on a comparison of the first hash value to the second hash value.

17. The one or more non-transitory computer-readable media of claim 16, wherein the content of the one or more pieces of sensitive data is provided to a data host provider computing device that is separate from the computer-readable media.

\* \* \* \* \*